(12) United States Patent
Lee et al.

(10) Patent No.: US 7,988,775 B2
(45) Date of Patent: Aug. 2, 2011

(54) WHITE RUST INHIBITING COMPOSITION FOR ALUMINUM PARTS

(75) Inventors: Ji Yong Lee, Bucheon (KR); Dong Ho Kwak, Yongin (KR); Byung Jun Jung, Anyang (KR); Sung Hyun Park, Andong (KR); Chul Hee Hong, Seoul (KR); Kwang Soon Kim, Seoul (KR)

(73) Assignees: Hyundai Motor Company, Seoul (KR); Kia Motors Corporation, Seoul (KR); Korea Houghton Corporation, Asan (KR)

( * ) Notice: Subject to any disclaimer, the term of this patent is extended or adjusted under 35 U.S.C. 154(b) by 0 days.

(21) Appl. No.: 12/703,385

(22) Filed: Feb. 10, 2010

(65) Prior Publication Data

US 2010/0326319 A1 Dec. 30, 2010

(30) Foreign Application Priority Data

Jun. 25, 2009 (KR) .................. 10-2009-0057138

(51) Int. Cl.
*C09D 5/08* (2006.01)
*C23F 11/00* (2006.01)
*C23F 11/18* (2006.01)
*C23F 15/00* (2006.01)

(52) U.S. Cl. .............. 106/14.05; 106/14.12; 106/14.14; 106/14.15; 106/14.21; 106/14.44; 106/286.7; 106/287.1; 106/482; 106/600; 106/629; 106/630; 106/634; 252/387

(58) Field of Classification Search ............. 106/14.05, 106/14.12, 14.14, 14.15, 14.21, 14.44, 286.7, 106/287.1, 482, 600, 629, 630, 634; 252/387
See application file for complete search history.

(56) References Cited

U.S. PATENT DOCUMENTS

| | | | | |
|---|---|---|---|---|
| 2,615,840 A | * | 10/1952 | Chapman | 205/710 |
| 3,575,866 A | * | 4/1971 | Strobel | 510/325 |
| 4,098,720 A | | 7/1978 | Hwa | |
| 4,382,870 A | | 5/1983 | Abel et al. | |
| 4,388,205 A | * | 6/1983 | Stettler et al. | 8/137 |
| 4,497,667 A | * | 2/1985 | Vashi | 148/254 |
| 7,595,000 B2 | * | 9/2009 | Keister | 210/687 |
| 2006/0019854 A1 | * | 1/2006 | Dyer et al. | 510/376 |
| 2010/0160526 A1 | * | 6/2010 | Sigman et al. | 524/424 |

FOREIGN PATENT DOCUMENTS

| | | |
|---|---|---|
| JP | 06-200188 A | 7/1994 |
| JP | 10-195345 A | 7/1998 |
| JP | 11-061117 A | 3/1999 |
| JP | 2005-097726 A | 4/2005 |
| KR | 10-2003-0097819 | 12/2003 |
| KR | 10-2007-0018044 | 2/2007 |

OTHER PUBLICATIONS

Derwent-Acc-No. 2006-534503, abstract of Korean Patent Specification No. KR 2005090062 A (Sep. 2005).*
Derwent-Acc-No. 2009-A35606, abstract of Chinese Patent Specification No. CN 101195791 A (Jun. 2008).*
Derwent-Acc-No. 2009-B46135, abstract of Chinese Patent Specification No. CN 101311316 A (Nov. 2008).*
Derwent-Acc-No. 2009-G35866, abstract of Chinese Patent Specification No. CN 101372393 A (Feb. 2009).*
Derwent-Acc-No. 2009-J80119, abstract of Korean Patent Specification No. KR 2009046472 A (May 2009).*

* cited by examiner

*Primary Examiner* — Anthony J Green
(74) *Attorney, Agent, or Firm* — Edwards Angell Palmer & Dodge LLP; Peter F. Corless

(57) ABSTRACT

The present invention provides an aluminum white rust inhibiting composition containing alkali metal metasilicate and alkali metal hydroxide as essential components. The composition described by the present invention can provide an anticorrosion function to vehicle aluminum parts without a separate surface process, thus reducing the manufacturing cost by reducing the number of processes and improving the durability of the vehicle aluminum parts.

5 Claims, 1 Drawing Sheet

| Humidity Time | Control Group | Example 1 | CK-2500 | P/R Er-82 |
|---|---|---|---|---|
| 2-Hour | Formed | Not formed | Not formed | Not formed |
| 9-Hour | Formed | Not formed | Formed | Formed |
| 18-Hour | Formed | Not formed | Formed | Formed |
| 45-hour | Formed | Formed | Formed | Formed |

WHITE RUST INHIBITING COMPOSITION FOR ALUMINUM PARTS

CROSS-REFERENCE TO RELATED APPLICATION

This application claims under 35 U.S.C. §119(a) the benefit of Korean Patent Application No. 10-2009-0057138 filed Jun. 25, 2009, the entire contents of which are incorporated herein by reference.

BACKGROUND

Technical Field

The present disclosure relates, generally, to a white rust inhibiting composition for aluminum parts of a vehicle engine. More particularly, the present invention relates to a white rust inhibiting composition comprising alkali metal metasilicate and alkali metal hydroxide for inhibiting the formation of white rust on aluminum parts of a vehicle engine.

The formation of white rust on a vehicle's aluminum parts is a problem that has been around for a long time. However, to date, a solution has not been found. In general, since aluminum is easily oxidized by oxygen in air, it is present in the form of aluminum oxide $Al_2O_3$. When the aluminum oxide is exposed to high temperature and humidity conditions, it reacts with atmospheric moisture to form white rust such as aluminum hydroxide $Al(OH)_3$. It has been shown that this white rust comprises bayerite and gibbsite by X-ray microprobe (XRM) analysis. The chemical reactions that form the white rust on the aluminum parts of the vehicle engine can be represented by the following formulas:

Reaction in the aluminum oxide layer:

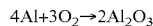

$$4Al+3O_2 \rightarrow 2Al_2O_3$$

Reaction between the aluminum oxide layer and moisture:

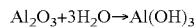

$$Al_2O_3+3H_2O \rightarrow Al(OH)_3$$

In evaluating environmental factors influencing the formation of aluminum white rust, it has been confirmed that one of the most important factors is condensation due to moisture. Accordingly, it can be understood that a technique for preventing the formation of white rust on aluminum is to protect the aluminum surface from moisture.

Preferred conventional methods for protecting the aluminum surface include wax or resin coating, anodizing, and painting.

Anti-corrosion by wax coating is to directly coat wax on the surface of aluminum parts such as timing chain cover, alternator, cylinder block/head, in-manifold, and the like in an engine room of the vehicle. However, the anti-corrosion by wax coating has certain consideration. First, there are possibilities that the wax coating is not available in some area such as alternator or chain cover due to narrow space. Second, the wax may cause environmental issues due to leakage and contamination. Further, the hardened residual wax may fall into the belt or rotation axis to cause noise problems, and the anti-corrosion may not be uniformly applied due to non-uniform wax coating.

An anodizing process for anti-corrosion is described herein below. In general, since aluminum is vulnerable to both acidic and alkaline conditions, it is quickly oxidized to form an aluminum oxide $Al_2O_3$ layer under such conditions. However, since the thus formed oxide layer is very thin, the corrosion resistance is not so high when it is exposed to high temperature and humidity conditions. Accordingly, in the case of the aluminum parts that require corrosion resistance, a post process such as anodizing is applied thereto. According to the anodizing process, the aluminum is suitably connected an oxidation electrode to be forcibly oxidized, thus forming a thick oxide layer having a thickness of more than 10 μm. The thus formed thick oxide layer serves to suitably protect the aluminum from the external environment. Accordingly, the anodizing process is widely used for the purpose of anti-corrosion for aluminum. However, the anodizing process cannot be applied to all aluminum parts of the vehicle engine due to its high cost. Accordingly, it is necessary to develop a process that reduces the cost and is easy to manage so that the anti-corrosion process can be suitably applied to the aluminum parts of the vehicle engine.

It is well known that the alkali metal hydroxide can be used as an ingredient for use in surface treatment. The reason for this is that the aluminum is colored by the alkali metal hydroxide. However, according to preferred embodiments of the present invention, it is possible to suitably prevent the aluminum from discoloring by adding alkali metal metasilicate to the alkali metal hydroxide even when a relatively large amount of alkali metal hydroxide is contained in the composition of the invention.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a white rust inhibiting composition, which can provide a cleaning function to vehicle aluminum parts without a separate surface process and suitably improve corrosion resistance by forming a silicon thin layer of about 20 nm on the surface of aluminum parts, thus suitably preventing corrosion.

In preferred embodiments, the present invention provides a white rust inhibiting composition, which can suitably improve durability of aluminum parts by providing anti-corrosion function to the aluminum parts and suitably reduce the manufacturing cost by reducing the number of processes.

In one aspect, the present invention provides an aluminum white rust inhibiting composition comprising 100 parts by weight of alkali metal metasilicate and 0.1 to 20 parts by weight of alkali metal hydroxide.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exem

DETAILED DESCRIPTION

Figures 1, 2:
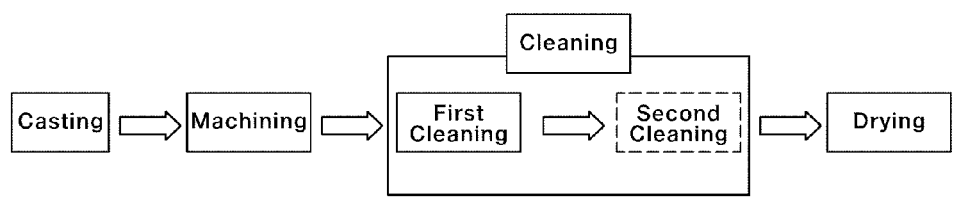
- FIG. 1 is a schematic diagram of a conventional method of processing aluminum parts.
FIG. 2 shows the images of the samples of the control group, Example 1, and commercially available products 1 and 2 (CK-2500 and P/R ER-82), on which the results of the formation of white rust after 2, 9, 18, and 45 hours were shown.

As described herein, the present invention includes an aluminum white rust inhibiting composition comprising alkali metal metasilicate and alkali metal hydroxide.

In one embodiment, the aluminum white rust inhibiting composition comprises 100 parts by weight of alkali metal metasilicate and 0.1 to 20 parts by weight of alkali metal hydroxide.

In one embodiment, the content of alkali metal hydroxide is 1 to 10 parts by weight with respect to 100 parts by weight of the alkali metal metasilicate.

In another embodiment, the alkali metal metasilicate comprises at least one selected from the group consisting of potassium metasilicate and sodium metasilicate.

In another further embodiment, the alkali metal hydroxide comprises at least one selected from the group consisting of potassium hydroxide and potassium sodium.

In still another further embodiment, the aluminum white rust inhibiting composition further comprises 0.1 to 20 parts by weight of at least one additive selected from the group consisting of alkali metal pyrophosphate, polyacrylic acid, 1-butoxy-2-propanol, and sodium tolyltriazole with respect to 100 parts by weight of the alkali metal metasilicate.

In another embodiment, the pH of the aluminum white rust inhibiting composition is in the range of 10 to 14.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

An aluminum white rust inhibiting composition according to preferred embodiments of the present invention will be described in more detail below.

As described herein, the white rust is formed on aluminum parts of a vehicle engine due to moisture.

U.S. Pat. No. 4,382,870, incorporated by reference in its entirety herein, discloses an antifreeze corrosion inhibitor composition for an aluminum engine, the composition comprising 1.12% of deionized water, 1.99% of dipotassium phosphate, 0.02% of aqueous potassium silicate solution, 0.11% of potassium hydroxide, 95.77% of ethylene glycol, and 1.99% of sodium tolyltriazole. However, the ingredients and contents in this composition are considerably different from those of the composition of the present invention. Moreover, the uses as a cleaning agent and an anti-corrosion agent are not proposed.

Korean Patent Publication No. 10-2007-0018044, incorporated by reference in its entirety herein, discloses a cleaning and corrosion inhibiting composition comprising mono, bis, and oligomeric phosphinosuccinic acid and polyacrylate. However, this reference does not disclose an alkali metal metasilicate compound and an alkali metal hydroxide compound mainly used in the present invention.

Preferably, when the aluminum white rust inhibiting composition of the present invention comprising alkali metal metasilicate and alkali metal hydroxide is suitably coated on the surface of such aluminum parts during cleaning process, it is possible to prevent the formation of white rust. More particularly, the aluminum white rust inhibiting composition serves as an anti-corrosion agent for preventing the formation of white rust by forming a silicon thin layer having a thickness of about 20 nm on the surface of aluminum parts.

In general, nonferrous metals include, but may not only be limited to, copper, aluminum, nickel, zinc, and tin, and various kinds of rust such as green rust, yellow rust, and white rust are formed on the surface according to their properties. Among them, the white rust is formed on aluminum and, when alkali metal metasilicate and alkali metal hydroxide as the main components of the aluminum white rust inhibiting composition in accordance with the present invention are simultaneously used, it is possible to suitably provide anti-corrosion and cleaning properties for preventing the formation of white rust on the aluminum parts of the vehicle engine.

In particular preferred embodiments, the alkali metal metasilicate, which is one of the main components of the aluminum white rust inhibiting composition in accordance with the present invention, plays an important role of forming a corrosion resistant layer on the surface of aluminum parts. Preferably, the alkali metal metasilicate may comprise at least one selected from the group consisting of potassium metasilicate and sodium metasilicate.

In certain preferred embodiments, the alkali metal hydroxide, which is another main component of the aluminum white rust inhibiting composition in accordance with the present invention, serves to suitably control the formation of the corrosion resistant layer and the molar ratio. Preferably, according to certain exemplary embodiments, the alkali metal hydroxide may be contained in an amount of 0.1 to 20 parts by weight with respect to 100 parts by weight of the alkali metal metasilicate, and in further exemplary embodiments, preferably in an amount of 1 to 10 parts by weight. In certain exemplary embodiments, when the content of alkali metal hydroxide is less than 0.1 parts by weight, the white rust inhibiting effect of the present invention may suitably deteriorate. According to other certain embodiments, when the content of alkali metal hydroxide is more than 20 parts by weight, a thick layer may be suitably formed on the aluminum parts to affect the following processes, and white remnants of the alkali metal metasilicate may cause problems. Accordingly, it is preferable according to certain embodiments of the invention, that the alkali metal hydroxide be used in the above range. Preferably, the alkali metal hydroxide may comprise at least one selected from the group consisting of potassium hydroxide and sodium hydroxide.

Further, the aluminum white rust inhibiting composition of the present invention may preferably comprise the following components to form a corrosion resistant layer, thus suitably improving the cleaning and anti-discoloration performance.

According to further preferred embodiments, the aluminum white rust inhibiting composition of the present invention may further comprise alkali metal pyrophosphate to form a corrosion resistant layer, thus suitably improving the cleaning performance. Preferably, the alkali metal pyrophosphate may comprise at least one selected from the group consisting of, but not limited only to, potassium pyrophosphate and sodium pyrophosphate.

Preferably, the aluminum white rust inhibiting composition of the present invention may further comprise polyacrylic acid to improve hard-water stability.

Further, the aluminum white rust inhibiting composition of the present invention may further comprise 1-butoxy-2-propanol to suitably maximize the cleaning performance.

In further preferred embodiments, the aluminum white rust inhibiting composition of the present invention may further comprise sodium tolyltriazole to suitably prevent the discoloration of nonferrous metals.

Preferably, the above-described alkali metal pyrophosphate, polyacrylic acid, 1-butoxy-2-propanol, sodium tolyltriazole, or a mixture thereof may be added in an amount of 0.1 to 20 parts by weight with respect to 100 parts by weight of the alkali metal metasilicate.

EXAMPLES

The following examples illustrate certain preferred embodiments of the present invention and are not intended to limit the same.

Examples 1 to 3 and Comparative Examples 1 to 5

Preparation of Aluminum White Rust Inhibiting Solutions

In one preferred embodiment, aluminum white rust inhibiting solutions were prepared with the following components shown in Table 1.

TABLE 1

| | Classification | Example | | | Comparative Example | | | | |
|---|---|---|---|---|---|---|---|---|---|
| | | 1 | 2 | 3 | 1 | 2 | 3 | 4 | 5 |
| Components (g) | Potassium metasilicate | 100 | 100 | 100 | 100 | 100 | 100 | — | 300 |
| | potassium hydroxide | 7 | 1 | 20 | 30 | — | — | 7 | 8 |
| | Potassium pyrophosphate | 6 | 6 | 6 | 6 | — | 6 | 6 | 6 |
| | polyacrylic acid | 4 | 4 | 4 | 4 | — | 4 | 4 | 4 |
| | 1-butoxy-2-propanol | 6 | 6 | 6 | 6 | — | 6 | 6 | 6 |
| | sodium tolyltriazole | 2 | 2 | 2 | 2 | — | 2 | 2 | 2 |

"—" represents no addition

Test Examples

Test Example 1

Evaluation of Properties

Preferably, test solutions were suitably prepared by diluting the aluminum white rust inhibiting solutions prepared in Examples 1 to 3 and Comparative Examples 1 to 5 with water in the ratio of 1:24. In further preferred embodiments, after preparing CK-2500, a commercially available test solution with the following components shown in Table 2, the pH values of the above prepared solutions and the aluminum surfaces to which the solutions were applied were suitably measured, and the results are shown in the following Table 3. Aluminum samples having a purity of more than 99% were suitably washed with methyl alcohol (in accordance with KS M 1817) and dried. Accordingly, the thus prepared aluminum samples were suitably immersed in a 250 ml beaker filled with 100 ml of each of the test solutions and left at room temperature for 24 hours. Thereafter, it was examined whether the aluminum samples were suitably discolored.

TABLE 2

| Commercially Available Product 1 (CK-2500) | Content (g) |
|---|---|
| Ion exchange water | 78 |
| C4-11 dicarboxylic acid | 5 |
| Ethoxylated propoxylated alcohol | 8 |
| Poly(oxypropylene)diamine | 3 |
| Polypropylene glycol ethylene oxide copolymer | 3 |
| Diethylene glycol monobutyl ether | 1 |
| Benzotriazole | 1 |

TABLE 3

| Classification | | pH | Al Discoloration Test |
|---|---|---|---|
| Example | 1 | 12.8 | Not discolored |
| | 2 | 12.6 | Not discolored |
| | 3 | 13.1 | Not discolored |
| Comparative Example | 1 | 13.2 | Discolored |
| | 2 | 12.4 | Not discolored |
| | 3 | 13.0 | Not discolored |
| | 4 | 12.6 | Discolored |
| | 5 | 12.6 | Not discolored |
| Commercially Available Product 1 (CK-2500) | | 8.0 | Not discolored |

As shown in the test results of Table 3, the pH of the test solutions prepared in Examples 1 to 3 was alkaline. However, in the case of the test solution prepared in Comparative Example 1, the pH thereof was strongly alkaline due to a large amount of potassium hydroxide added, which resulted in aluminum discoloration. In the case of the test solutions prepared in Comparative Examples 2 and 3, to which no potassium hydroxide was added, the pH was strongly alkaline, and the aluminum was not discolored. In the case of the test solution prepared in Comparative Example 4, to which no potassium metasilicate was added, the aluminum was discolored due to the potassium hydroxide. The pH of the commercially available CK-2500 test solution was near neutral (pH 8), and the aluminum was not discolored.

Preferably, it can be understood from the test results that the conventional aluminum white rust inhibiting compositions have either a small amount or no alkali metal hydroxide and have a pH near neutral to suitably prevent the discoloration of aluminum; however, the aluminum white rust inhibiting composition of the present invention comprises both alkali metal hydroxide and the alkali metal metasilicate and has a strongly alkaline pH, and thus the cleaning and anti-discoloration performance is improved.

Test Example 2

Humidity Cabinet Test

In another exemplary embodiment of the present invention, a humidity cabinet test was suitably performed in accordance with KS M 2109 on the aluminum samples treated with the test solutions prepared in Examples 1 to 3 and Comparative Examples 1 to 5. In the same manner, the humidity cabinet test was performed on the aluminum sample treated with the CK-2500 test solution and on an aluminum sample to which a commercially available wax (P/R ER-82) was applied. Preferably, during the humidity cabinet test, an alternator housing (ADC 12) was used at a humidity of 95% and a temperature of 45° C. Preferably, the samples were immersed in the aluminum white rust test solutions and the CK-2500 test solution at a temperature of 60° C. and a concentration of 2.0 brix (%) for two minutes. Preferably, no pre-treatment was conducted on the sample coated with wax, and the thus prepared samples were put into a humidity chamber to determine the time point at which the white rust was formed on the aluminum surfaces. A sample on which no solution was treated was taken as a control group, and the results are shown in the following Table 4.

TABLE 4

| Classification | | Humidity Cabinet Test |
|---|---|---|
| Control Group | | 2 hours/Failed |
| Example | 1 | 24 hours/Passed |
| | 2 | 18 hours/Failed |
| | 3 | 24 hours/Failed |
| Comparative Example | 1 | 2 hours/Failed |
| | 2 | 18 hours/Failed |
| | 3 | 18 hours/Failed |
| | 4 | 2 hours/Failed |
| | 5 | 24 hours/Passed |
| Commercially Available Product 1 (CK-2500) | | 9 hours/Failed |
| Commercially Available Product 2 (P/R ER-82) | | 18 hours/Failed |

As shown in the test results of Table 4, the anti-corrosion performance of the samples of Examples 1 to 3 were all excellent. However, in the case of the sample of Comparative Example 5, it could be expected that the corrosion resistance was increased by the silicon layer which was non-uniformly thickened by the addition of a greater amount of alkali metal metasilicate than the other components. However, these aluminum parts coated with such compositions have a low commodity value, and thus there are limitations in applying such aluminum parts to an actual vehicle.

FIG. 2 shows the images of the samples of the control group, Example 1, and commercially available products 1 and 2 (CK-2500 and P/R ER-82), on which the results of the formation of white rust after 2, 9, 18, and 45 hours were shown.

It can be understood from the test results shown in FIG. 2, that the aluminum samples, which were surface-treated with the aluminum white rust inhibiting test solution of the present invention, delayed the formation of white rust more than 22 times compared to the samples, which were not surface-treated with the test solution, and delayed the formation of white rust more than 5 times compared to the sample, which was surface-treated with the CK-2500 test solution.

As described in the examples herein, while the CK-2500 test solution has a slight anti-corrosion effect by removing alkaline components (working oil) from the aluminum surface, the aluminum white rust inhibiting composition of the present invention inhibits or reduces the formation of aluminum white rust by improving the cleaning performance and forming an oxidized layer having a large thickness on the aluminum surface by the potassium.

Moreover, it can be seen that the aluminum white rust inhibiting test solution of the present invention suitably delays the formation of white rust over 2.5 times compared to the conventional method of coating the wax (P/R ER-82), from which it is confirmed that the aluminum white rust inhibiting composition of the present invention is a technique which can be suitably substituted for the conventional wax anti-corrosion which is eliminated or performed only on reachable portions of some aluminum parts due to limited space.

As described herein, according to the white rust inhibiting composition comprising alkali metal metasilicate and alkali metal hydroxide, which has been not used as a component of the conventional aluminum anti-corrosion composition, it is possible to provide a suitably cleaning function to vehicle aluminum parts without a separate surface process and improve corrosion resistance by forming a silicon thin layer on the surface of aluminum parts, thus preventing corrosion. Accordingly, it is possible to improve the durability of aluminum parts by providing anti-corrosion function to the aluminum parts and reduce the manufacturing cost by reducing the number of processes.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An aluminum white rust inhibiting composition comprising:
   100 parts by weight of alkali metal metasilicate and 0.1 to 20 parts by weight of alkali metal hydroxide, and
   0.1 to 20 parts by weight of at least one additive selected from the group consisting of alkali metal pyrophosphate, polyacrylic acid, 1-butoxy-2-propanol, and sodium tolyltriazole with respect to 100 parts by weight of the alkali metasilicate.

2. The aluminum white rust inhibiting composition of claim 1, wherein the content of alkali metal hydroxide is 1 to 10 parts by weight with respect to 100 parts by weight of the alkali metal metasilicate.

3. The aluminum white rust inhibiting composition of claim 1, wherein the alkali metal metasilicate comprises at least one selected from the group consisting of potassium metasilicate and sodium metasilicate.

4. The aluminum white rust inhibiting composition of claim 1, wherein the alkali metal hydroxide comprises at least one selected from the group consisting of potassium hydroxide and sodium hydroxide.

5. The aluminum white rust inhibiting composition of claim 1, wherein the pH of the aluminum white rust inhibiting composition is in the range of 10 to 14.

* * * * *